United States Patent [19]

Anderson et al.

[11] 4,184,797
[45] Jan. 22, 1980

[54] LIQUID-COOLED TURBINE ROTOR

[75] Inventors: Rodger O. Anderson, Scotia; Arthur J. Piekarski, Burnt Hills, both of N.Y.

[73] Assignee: General Electric Company, Schenectady, N.Y.

[21] Appl. No.: 842,407

[22] Filed: Oct. 17, 1977

[51] Int. Cl.$^2$ ............................................. F01D 5/18
[52] U.S. Cl. ..................................... 416/95; 415/115
[58] Field of Search ..................... 416/92, 95, 97, 90, 416/96; 415/115, 175

[56] References Cited

U.S. PATENT DOCUMENTS

| | | | |
|---|---|---|---|
| 2,657,901 | 11/1953 | McLeod | 416/97 |
| 3,343,806 | 9/1967 | Bobo | 415/115 |
| 3,446,481 | 5/1969 | Kydd | 416/92 |
| 3,551,068 | 12/1970 | Scalzo | 415/115 |
| 3,602,605 | 8/1971 | Lee et al. | 415/175 |
| 4,086,757 | 5/1978 | Karstensen | 415/115 |

FOREIGN PATENT DOCUMENTS

| | | | |
|---|---|---|---|
| 492862 | 5/1953 | Canada | 416/92 |
| 1093301 | 5/1955 | France | 415/115 |
| 49126 | 7/1940 | Netherlands | 416/95 |
| 913167 | 12/1962 | United Kingdom | 416/95 |
| 935383 | 8/1963 | United Kingdom | 416/95 |
| 1194663 | 6/1970 | United Kingdom | 415/115 |

*Primary Examiner*—Everette A. Powell, Jr.
*Assistant Examiner*—Arthur N. Trausch, III
*Attorney, Agent, or Firm*—Jerome C. Squillaro

[57] ABSTRACT

An arrangement is provided for supplying liquid coolant to liquid-cooled turbine buckets of a gas turbine power plant. The buckets have internal coolant passages and the outer rims of turbine discs have coolant channels which communicate coolant from the discs to the passages in the buckets. The forward, intermediate and aft discs with sealing spacers interposed between adjacent discs are mounted on a shaft. The arrangement includes a forward flange, an intermediate flange and an aft flange. The flanges are adjacent to the corresponding discs. The forward and aft flanges, the discs and the spacers have a plurality of aligned axially extending apertures circumferentially disposed about the shaft. Bolts extend through the apertures to secure the discs, spacers and flanges in abutting contact. Each of the interposed spacers cooperates with a corresponding disc to form a circumferentially disposed chamber. In order to supply liquid coolant to the rotor, the shaft includes an axially extending passage for liquid coolant having openings radially inwardly of the flanges for discharging coolant onto the flanges. The flanges direct the coolant, under influence of centrifugal force, to the discs. The discs include means for communicating coolant from the forward flange to a forward chamber, from the intermediate flange to an intermediate chamber and from the aft flange to an aft chamber. The forward, intermediate and aft chambers direct coolant, under influence of centrifugal force, to the outer rim channels in the corresponding discs.

8 Claims, 7 Drawing Figures

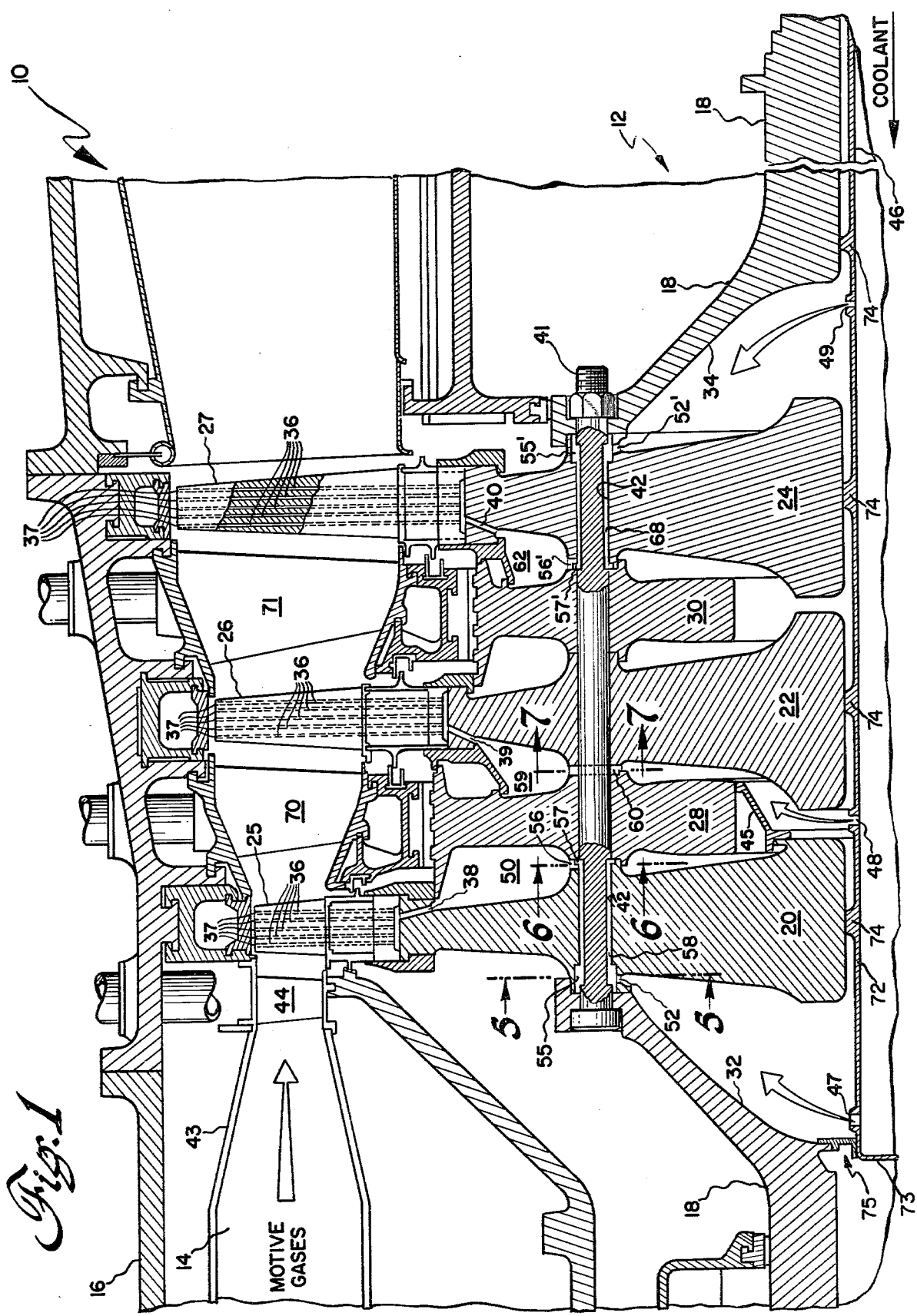

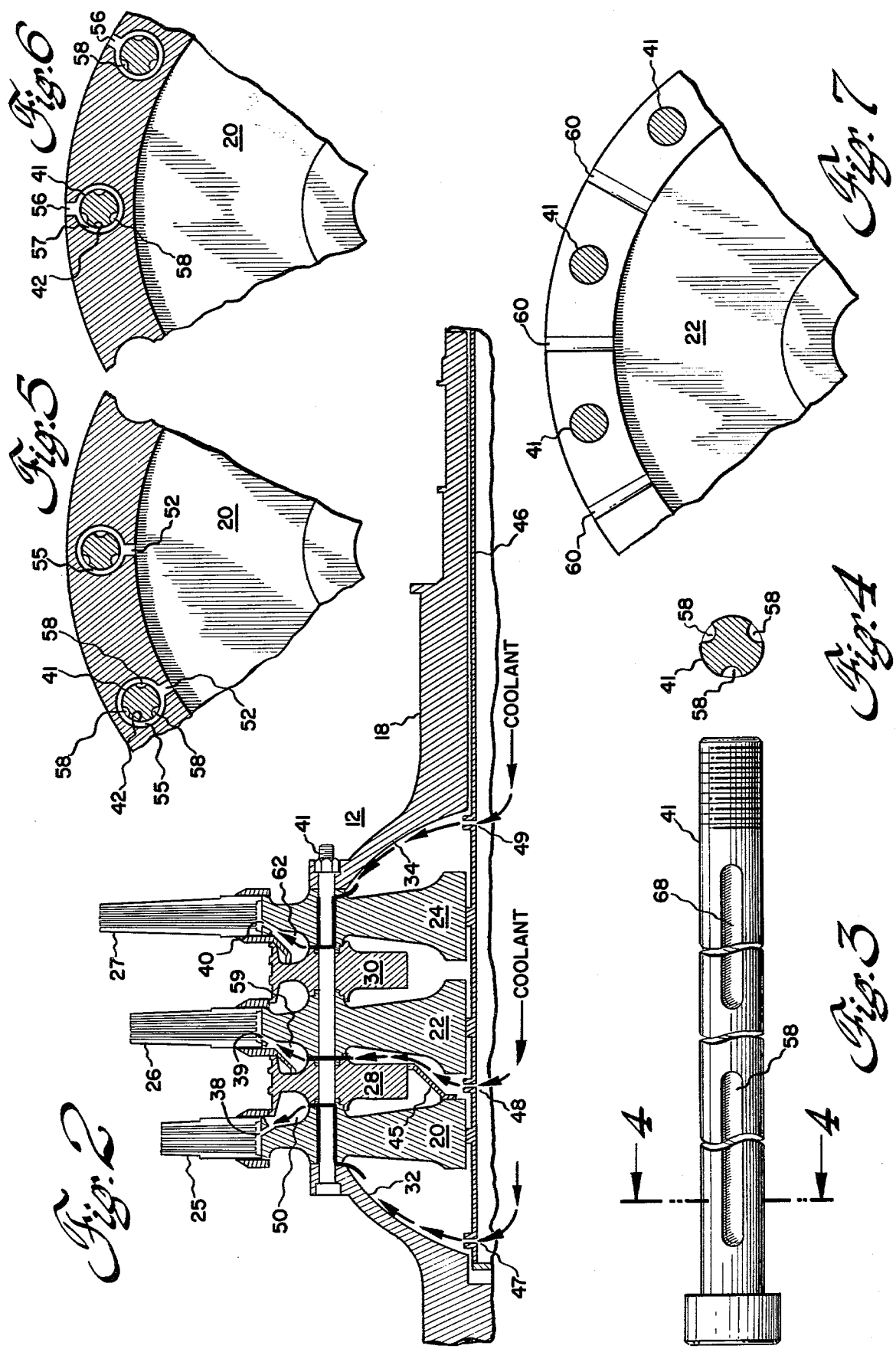

LIQUID-COOLED TURBINE ROTOR

BACKGROUND OF THE INVENTION

1. Field of the Invention

The present invention relates generally to gas turbine power plants, and more particularly, to an arrangement for providing liquid coolant to the turbine buckets of the power plant.

2. Description of the Prior Art

It is well known that the efficiency and output of a gas turbine power plant can be increased by increasing the operating temperature of the turbine. As a practical matter, however, the turbine operating temperature is limited by the material properties of the various turbine components exposed to the high temperature. The hot combustion gases combined with fuel contaminants can produce rapid oxidation and corrosion of the components when they are at high temperatures. This is known as hot corrosion. In order to minimize hot corrosion of the materials, the maximum temperature of the components is preferably limited to 1000° F. In order to achieve high operating temperatures it is therefore necessary to provide cooling for critical turbine components such as the turbine buckets.

Where the gas turbine firing temperature is in the range of 2800° F. it is believed that water cooling is well suited for maintaining the temperature of the turbine buckets at levels where thermal stress and resistance to hot corrosion would be acceptable. One problem associated with water cooling of turbine buckets is delivery of the water to the rotating buckets in a uniform regulated manner.

The prior art has broadly considered the flow of liquid coolant to transfer heat from turbine buckets. One of the systems having liquid-cooled buckets is shown in U.S. Pat. No. 3,446,481 to Kydd. The system disclosed in Kydd uses stationary spray nozzles which extend through the turbine vanes and which spray water toward coolant ports in the rotating turbine discs for distribution to the buckets. A sprayed liquid flow is, however, very sensitive and difficult to regulate over the operating range of the turbine. The dynamics of the turbine rotor produce variable axial forces on the coolant spray at different turbine speeds which affect the trajectory of the spray. It is therefore extremely difficult to assure that the spray is properly aimed at the coolant ports over the entire operating range of the turbine. The stationary external supply of liquid coolant also requires indirect regulation of the flow rate in accordance with variations in the turbine speed.

Accordingly, one object of the present invention is to provide an arrangement for a gas turbine in which the rotor is effectively cooled with liquid coolant.

Another object is to provide an arrangement for a gas turbine in which liquid coolant is supplied directly to the rotor through passages in the turbine disc to provide effective cooling over the entire operating range of the turbine.

Another object is to provide an arrangement for supplying liquid coolant to a gas turbine in which the flow of coolant is propelled by centrifugal force and generally self-regulated to accommodate variations in turbine speeds.

Another object is to provide an arrangement for a gas turbine in which liquid coolant is supplied directly to the rotor in a manner that prevents or substantially reduces the possibility of contamination of the coolant with carbon particles or other products of the combustion system.

Still a further object is to provide an arrangement for supplying liquid coolant to a gas turbine from an axial coolant supply passage to provide an effective, self-regulated flow of coolant to the turbine buckets over the entire operating range of the turbine.

SUMMARY OF THE INVENTION

The invention is directed to an arrangement for supplying liquid coolant to liquid-cooled turbine buckets of a gas turbine power plant. The turbine includes a shaft rotatably supported in a casing, turbine discs including a forward, an intermediate and an aft disc mounted on the shaft with buckets mounted on the outer rim of the discs and sealing spacers interposed between the discs. The buckets have internal coolant passages and the outer rims of the discs have coolant channels which communicate coolant from the discs to the passages in the buckets. The arrangement for supplying liquid coolant includes a forward flange, an intermediate flange and an aft flange on the shaft. The flanges are adjacent to the corresponding discs. The flanges, the discs and the spacers have a plurality of axially aligned apertures circumferentially disposed about the shaft. Bolts extend through the apertures to secure the discs, spacers and flanges in abutting contact. Each of the interposed spacers cooperates with a corresponding disc to form a circumferentially disposed chamber which directs coolant to the outer rim channels in each corresponding disc. The shaft further includes an axially extending passage for liquid coolant having openings adjacent the flanges for discharging coolant onto the flanges. The flanges direct the coolant, under influence of centrifugal force, to the discs. The discs include means for communicating coolant from the forward flange to a forward chamber, from the intermediate flange to an intermediate chamber and from the aft flange to an aft chamber.

In a specific embodiment, the bolts are fluted to provide a first set of axial passages axially aligned with the apertures in the forward disc and are fluted to provide a second set of axial passages spaced from the first set and axially aligned with the apertures in the aft disc. The forward and aft discs have radially inwardly disposed passages intersecting the apertures on the side of the respective disc adjacent the respective flange and have radially outwardly disposed passages intersecting the apertures on the opposite side of the respective discs. Liquid coolant is communicated from the respective flange along the axial passage of the corresponding disc to the respective forward and aft chambers. The intermediate disc has slots forming radially extending passages, circumferentially disposed on the side of the disc adjacent to the intermediate flange. The slots are provided for communicating coolant from the intermediate flange to the intermediate chamber.

In another embodiment, only the forward stage of buckets receive the coolant. The means for passage of coolant from the flange to the outer rim channels include flutes in the bolts, which provide axial passages through the disc. The disc has radially inwardly disposed passages intersecting the apertures on the side of the disc adjacent the flange for communicating coolant from the flange to the axial passages in the bolts. The disc also has radially outwardly disposed passages intersecting the apertures on the opposite side of the disc for communicating coolant from the axial passages to the outer rim channels of the disc.

Another embodiment includes a different passage means for communicating coolant to a single stage of turbine buckets. The means for passage of coolant from the flange to the outer rim channels of the disc includes slots forming radially extending passages circumferentially disposed on the surface of the disc adjacent the flange. The slots communicate coolant under the influence of centrifugal force from the flange radially outwardly along the disc to the outer rim channels.

BRIEF DESCRIPTION OF THE DRAWINGS

While the novel features of the invention are set forth with particularity in the appended claims, the invention will be better understood along with other features thereof from the following detailed description taken in conjunction with the drawings, in which:

FIG. 1 is a cross-sectional elevational view of a portion of a gas turbine employing the cooling arrangement of this invention and showing the detailed coolant passages within the turbine rotor;

FIG. 2 is a cross-sectional elevation view diagrammatically showing an axial coolant supply and coolant passages within the gas turbine rotor;

FIG. 3 is an enlarged view of the fluted longitudinal bolts shown in FIG. 1;

FIG. 4 is a cross-sectional view taken along line 4—4 of FIG. 3;

FIG. 5 is a cross-sectional view taken along line 5—5 of FIG. 1;

FIG. 6 is a cross-sectional view taken along line 6—6 of FIG. 1; and

FIG. 7 is a cross-sectional view taken along line 7—7 of FIG. 1.

DESCRIPTION OF THE PREFERRED EMBODIMENT

Referring first to FIGS. 1 and 2, there is shown a portion of an elastic fluid axial flow gas turbine power plant 10 showing a portion of a rotor structure 12 and a combustor 14 within an outer casing 16. The rotor structure includes a shaft 18 having a forward disc 20, an intermediate disc 22 and an aft disc 24 mounted on the shaft. Annular rows of buckets 25, 26 and 27 are mounted on the outer rims of the discs and extend radially outwardly from the respective discs to form the stages of the turbine. Interposed between the forward and intermediate discs is sealing spacer 28 and between the intermediate and aft discs is sealing spacer 30. The shaft 18 has a forward flange 32 extending radially outwardly from the shaft adjacent the forward disc and an aft flange 34 extending radially outwardly from the shaft adjacent the corresponding aft disc. The turbine buckets 25, 26 and 27 have internal coolant passages 36 which circulate coolant within each bucket and expel the coolant, along with heat transferred from the buckets to the coolant, at exit ports 37 at the tip of each bucket. The discs 20, 22 and 24 each have an outer rim with a plurality of coolant channels 38, 39 and 40 extending through each respective outer rim for communicating coolant to the corresponding passages 36 in each bucket. The components of rotor structure 12 are secured in abutting compressive contact by a plurality of bolts 41 (only one being shown) which extend through apertures 42 in the forward and aft flanges, the discs and the spacers. The foregoing construction is well known in the art.

Hot motive fluid such as pressurized combustion gases is generated in the plurality of circumferentially disposed combustors 14 (only one being shown) and is conducted through the transition members 43 to the turbine inlet nozzles 44 at approximately 2800° F. The gases are directed by the nozzles against rotor buckets 25, and, in turn, by nozzles 70 against buckets 26 and nozzles 71 against buckets 27 to rotate rotor structure 12.

In this preferred embodiment of the invention, each of the stages of turbine buckets are to be provided with liquid coolant. However, the hot motive gases progressively decrease in temperature as the gases expand downstream through the successive stages of the turbine. The latter stages of buckets require a progressively lesser amount of heat to be transferred than the forward stage. Therefore, it may be adequate in specific turbine arrangements to provide liquid coolant to only the forward stage of buckets. The following discussion of the arrangement providing liquid coolant to the multistages of turbine buckets should be understood to also apply separately to embodiments utilizing only a portion of the arrangement to provide coolant to a single stage of turbine buckets.

The preferred embodiment includes an intermediate additional flange 45 extending between the disc 20 and the spacer 28 adjacent the radially inner portion of spacer 28. Flange 45 facilitates cooling of the intermediate stage, as will be discussed later in detail.

In order to cool the rotor buckets, liquid coolant is supplied to an axially extending passage 46 in shaft 18. In order to direct coolant from the axially extending passage 46 to the flanges 32, 45 and 34, a plurality of openings including forward openings 47, intermediate openings 48 and aft openings 49 communicating with passage 46 are formed in the shaft adjacent and radially inwardly of the corresponding flanges. As previously discussed, the hot motive gases progressively decrease in temperature as the gases expand downstream through the successive stages of the turbine. Therefore, the latter stages of turbine buckets require a progressively lesser amount of heat to be transferred than the forward stage. For this reason, the openings 47, 48 and 49 are of a number and size which meter a predetermined quantity of coolant onto the flanges in progressively lesser amounts corresponding to the progressively lesser heat transfer requirements. In a specific embodiment, openings 47 consist of 10 equally spaced holes each having a 0.543 inch diameter, openings 48 consist of 10 equally spaced holes each having a 0.336 inch diameter and openings 49 consist of 10 equally spaced holes each having a 0.222 inch diameter. The openings meter the predetermined supply of coolant to the corresponding flange required for effectively transferring heat from the corresponding stage of buckets. Alternatively, in another embodiment, the axial passage utilizes openings having a fixed diameter such as openings 47 consisting of 26 equally spaced holes each having a 0.336 inch diameter, openings 48 consisting of 10 equally spaced holes each having a 0.336 inch diameter and openings 49 consisting of 4 equally spaced holes each having a 0.336 inch diameter. Further, in other embodiments the openings could consist of any size, shape and number which meter the appropriate quantity of coolant onto the flanges.

Consider first the structure related to the forward stage of buckets. Forward flange 32 directs coolant from openings 47 under influence of centrifugal force to forward disc 20. The disc 20 includes a means for communicating coolant from the flange 32 to a circumferentially disposed forward chamber 50. The forward chamber 50 is formed between disc 20 and spacer 28 to direct coolant to coolant channels 38 in the outer rim of disc 20.

The means for communicating coolant from flange 32 to chamber 50 is shown in FIGS. 1, 5 and 6. The disc 20 has a radially inwardly disposed passage 52 for each aperture which intersects the aperture 42 on the side of the disc adjacent the flange 32. An annular chamber 55 is formed in disc 20 surrounding each aperture 42. The chamber 55 is shown as a counterbore extending into each forward disc aperture 42. The disc 20 is formed with a radially outwardly disposed passage 56 for each aperture 42 which intersect the aperture 42 on the opposite side of the disc. Passages 56 communicate coolant from each aperture 42 by a chamber 57 shown as a counterbore extending into each forward disc aperture. Bolts 41 include flutes 58 to provide a plurality of axial passages along the forward disc apertures 42 as shown in FIGS. 3 and 4. As an alternative embodiment, the passages extending between chambers 55 and 57 could be provided by a plurality of axially extending grooves formed in the walls of the apertures rather than by flutes in the bolts. Flange 32 directs coolant, under influence of centrifugal force, into passages 52 then along axial passages 58 to passages 56 and into chamber 50. Chamber 50 directs coolant, under influence of centrifugal force, directly into coolant channels 38 and thence into passages 36 in buckets 25 to thereby cool the forward buckets.

Referring to FIGS. 1, 2 and 7, there is shown a similar arrangement for cooling the intermediate stage of the turbine buckets 26. Intermediate flange 45 directs coolant from openings 48, under influence of centrifugal force, to intermediate disc 22. The disc 22 includes a means for communicating coolant from flange 45 to a circumferentially disposed intermediate chamber 59. Chamber 59 is formed between disc 22 and spacer 28. The disc 22 has a plurality of slots forming radially extending passages 60 circumferentially disposed on the side of the disc 22 adjacent the flange 45. The flange 45 directs coolant, under influence of centrifugal force, into passages 60 and into chamber 59. Chamber 59 directs coolant, under influence of centrifugal force, directly into coolant channels 39 in communication with passages 36 in buckets 26 to thereby cool the intermediate buckets.

The structure for providing coolant to the aft stage of buckets is similar to the arrangement previously discussed for the forward stage. Referring again to FIGS. 1, 2, 5 and 6, there is shown the arrangement for cooling the aft stage of the turbine buckets 27. Flange 34 directs coolant from openings 49, under influence of centrifugal force, to aft disc 24. The disc 24 includes a means for communicating coolant from flange 34 to a circumferentially disposed aft chamber 62. The aft chamber 62 is formed between disc 24 and spacer 30. The disc 24 has a plurality of radially inwardly disposed passages 52' (similar to passages 52 in FIG. 5) which intersect the apertures 42 on the side of the disc adjacent flange 34. An annular chamber 55' is formed in disc 24 surrounding each aperture 42. The chamber 55' (similar to chamber 55 of FIG. 5) is shown as a counterbore extending into apertures 42. The disc 24 has a plurality of radially outwardly disposed passages 56' (similar to passages 56 shown in FIG. 6) which intersect each aperture 42 on the opposite side of the disc. An annular chamber 57' is formed in the disc 24 surrounding each aperture 42. The chamber 57' (similar to chamber 57 shown in FIG. 6) is shown as a counterbore extending into each aperture 42. Bolts 41 include flutes 68 (similar to flutes 58 in FIGS. 5 and 6) to provide a plurality of axial passages along the apertures 42 as shown in FIG. 3. Flange 34 directs coolant, under influence of centrifugal force, into passages 52', then along axial passages 68 to passages 56' and into chamber 62. Chamber 62 directs coolant, under influence of centrifugal force, directly into coolant channels 40 in communication with passages 36 in buckets 27 to thereby cool the aft buckets.

The shaft passage 46 has been shown as being formed by a tubular member 72 which is closed at its upstream end 73 and is telescoped within the shaft 18. The tubular member 72 is suitably secured, as at 75, to the shaft 18 adjacent the flange 32 and is supported along its length by axially spaced annular lands 74 which abut the internal diameter of the discs and the internal diameter of the downstream portion of the shaft 18, as at 75.

The above-described arrangement provides for a gas turbine in which the rotor is effectively cooled with liquid coolant. The liquid coolant is supplied directly through the rotor and thereby provides effective cooling over the entire operating range of the turbine. The arrangement provides for liquid coolant to be supplied through an internal passage along the central axis of the turbine and is generally propelled through the turbine by centrifugal force and is thereby selfregulated by the speed of the turbine. The arrangement also keeps the liquid coolant free from contamination from the products of combustion.

While specific embodiments of the present invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. In a gas turbine including a casing, a shaft rotatably supported in said casing, a turbine disc mounted on said shaft and turbine buckets mounted on the outer rim of said disc and extending radially outwardly therefrom, said buckets having internal coolant passages and said disc having coolant channels through the outer rim which communicate liquid coolant to said buckets, an arrangement for supplying liquid coolant to said buckets comprising:
  (a) a flange on said shaft extending radially outwardly from said shaft and adjacent to said disc;
  (b) said shaft including an axially extending passage for liquid coolant and including openings adjacent said flange for discharging coolant from said axially extending passage onto said flange;
  (c) said flange directing the coolant, under influence of centrifugal force, radially outwardly toward said disc;
    (i) said flange having a plurality of circumferentially disposed apertures;
    (ii) said disc having a plurality of apertures aligned with said apertures in said flange;
  (d) said disc including means for passage of coolant from said flange to said outer rim channels; and
  (e) a plurality of bolts extending longitudinally through said apertures for securing said disc to said flange in abutting contact, said bolts being fluted to provide a plurality of axial passages forming a portion of said means for passage of coolant.

2. The arrangement as recited in claim 1,
(a) wherein said means for passage of coolant comprises:
   (i) radially inwardly disposed passages in said disc, said passages intersecting said apertures on the side of said disc adjacent said flange and communicating coolant from said flange to said axial passages in said bolts; and
   (ii) radially outwardly disposed passages in said disc, said passages intersecting the apertures on the opposite side of said disc and communicating coolant from said axial passages in said bolts to said outer rim channels.

3. In a gas turbine including a casing, a shaft rotatably supported in said casing, a plurality of turbine discs in said casing including a forward disc, an aft disc and an intermediate disc mounted on said shaft, turbine buckets mounted on each said disc and extending radially outwardly therefrom, said buckets having internal coolant passages and each said disc having coolant channels through the outer rim which communicate liquid coolant to said buckets, an arrangement for supplying liquid coolant to said buckets comprising:
(a) a forward flange, an aft flange and an intermediate flange extending radially outwardly from said shaft, each said flange being adjacent to a corresponding one of said discs;
(b) sealing spacers interposed between said discs and mounted for rotation therewith;
(c) said forward flange, said aft flange, said discs and said spacers having axially aligned apertures circumferentially disposed about said shaft;
(d) a plurality of bolts, said bolts extending through said apertures and securing said flanges, discs and spacers in abutting contact, said bolts having flutes therein to provide a plurality of axial passages along said apertures;
(e) said shaft including an axially extending passage for liquid coolant and including openings adjacent said flanges for discharging coolant onto said flanges;
(f) each of said flanges directing the coolant, under influence of centrifugal force, radially outwardly toward a corresponding one of said discs;
(g) each of said spacers forming with a corresponding one of said discs a circumferentially disposed chamber, each of said chambers directing coolant to said outer rim channels in a corresponding one of said discs;
(h) means including said axial passages for communicating coolant from said forward flange to said forward chamber and from said aft flange to said aft chamber; and
(i) said chambers directing liquid coolant, under influence of centrifugal force, directly into corresponding outer rim channels.

4. The arrangement as recited in claim 3, wherein said means for communicating coolant from said forward flange to said forward chamber comprises:
(a) said forward disc having radially inwardly disposed passages intersecting said apertures on the side of said forward disc adjacent said forward flange and having radially outwardly disposed passages intersecting said apertures on the opposite side of said forward disc.

5. The arrangement as recited in claim 3 further comprising:
a plurality of slots forming radially extending passages, circumferentially disposed on the side of said intermediate disc adjacent said intermediate flange for communicating coolant from said intermediate flange to said intermediate chamber.

6. The arrangement as recited in claim 3, wherein said means for communicating coolant from said aft flange to said aft chamber comprises:
(a) said aft disc having radially inwardly disposed passages intersecting the apertures on the side of said aft disc adjacent said aft flange and having radially outwardly disposed passages intersecting the apertures on the opposite side of said aft disc.

7. The arrangement as recited in claim 3, wherein:
(a) said openings in said shaft adjacent said forward flange are of a number and size which meter a predetermined quantity of coolant onto said forward flange; and
(b) wherein, said openings in said shaft adjacent said intermediate flange are of a number and size which meter a quantity of coolant lesser than said quantity of coolant metered onto said forward flange; and
(c) wherein said openings in said shaft adjacent said aft flange are of a number and size which meter a quantity of coolant lesser than said quantity of coolant metered onto said intermediate flange.

8. The arrangement as recited in claim 7, wherein:
(a) said openings in said shaft adjacent said intermediate flange have a smaller size than said openings adjacent said forward flange; and
(b) said openings in said shaft adjacent said aft flange have a smaller size than said openings adjacent said intermediate flange.

* * * * *